United States Patent [19]
Brownlie et al.

[11] Patent Number: 5,489,039
[45] Date of Patent: Feb. 6, 1996

[54] ENCLOSURE HAVING A LID PIVOTABLE TO A SELFSUSTAINING OPEN POSITION

[75] Inventors: Alan W. Brownlie, Skaneateles, N.Y.; Scott S. Duesterhoeft, Etters; James W. Robertson, Oberlin, both of Pa.

[73] Assignee: The Whitaker Corporation, Wilmington, Del.

[21] Appl. No.: 350,443

[22] Filed: Dec. 6, 1994

Related U.S. Application Data

[62] Division of Ser. No. 35,129, Mar. 18, 1993, Pat. No. 5,378,174.

[51] Int. Cl.⁶ .................................................. B65D 43/24
[52] U.S. Cl. ......................................................... 220/335
[58] Field of Search .................................... 220/335–338

[56] References Cited

U.S. PATENT DOCUMENTS

| | | | |
|---|---|---|---|
| D. 282,654 | 2/1986 | Perry et al. | D13/41 |
| D. 340,693 | 10/1993 | Brownlie et al. | D13/184 |
| 4,204,608 | 5/1980 | Gatto | 220/335 |
| 4,282,983 | 8/1981 | Swartzbaugh | 220/335 |
| 4,488,008 | 12/1984 | Dellinger et al. | 179/81 R |
| 4,560,835 | 12/1985 | Dillard | 179/81 C |
| 4,624,514 | 11/1986 | Smith | 379/412 |
| 4,644,095 | 2/1987 | Bright et al. | 174/50 |
| 4,658,422 | 4/1987 | Sparks | 379/442 |
| 4,694,118 | 9/1987 | Schmidt | 174/41 |
| 4,723,919 | 2/1988 | Crane | 439/709 |
| 4,729,059 | 3/1988 | Wang | 361/356 |
| 4,731,501 | 3/1988 | Clark et al. | 174/65 R |
| 4,741,032 | 4/1988 | Hampton | 379/399 |
| 4,749,359 | 6/1988 | White | 439/133 |
| 4,782,427 | 11/1988 | Marks | 361/426 |
| 4,800,588 | 1/1989 | Poster, Jr. | 379/412 |
| 4,887,747 | 12/1989 | Ostrowsky et al. | 220/335 |
| 4,890,318 | 12/1989 | Crane et al. | 379/399 |
| 4,910,770 | 3/1990 | Collins et al. | 379/399 |
| 4,967,924 | 11/1990 | Murofushi et al. | 220/335 |
| 4,979,634 | 12/1990 | Begley | 220/335 |
| 4,985,962 | 1/1991 | Weber | 16/232 |
| 4,993,970 | 2/1991 | Littrell | 439/535 |
| 5,145,388 | 9/1992 | Brownlie et al. | 439/142 |
| 5,146,650 | 9/1992 | Robertson | 16/259 |
| 5,205,431 | 4/1993 | Zinnbauer | 220/4.22 |
| 5,206,646 | 4/1993 | Capper et al. | 174/51 |
| 5,219,302 | 6/1993 | Robertson et al. | 439/404 |
| 5,321,577 | 6/1994 | Capper et al. | 361/119 |
| 5,323,454 | 6/1994 | Shay et al. | 379/327 |

OTHER PUBLICATIONS

*AMP Instruction Sheet IS* 3217, "AMP Quiet Front Cross–Connect Terinal Closure 769147–1", two pages; 1991; AMP Incorporated, Harrisburg, PA.

*AT&T Brochure*, "Outside Plant Systems", six pages, Feb. 1987; AT&T Network Systems, Greensboro, NC.

*Kcptel Brochure*, "1642 Protector/Terminal Closure", two pages; Nov. 1988; Kreptel Inc., Tinton Falls, NJ.

*Primary Examiner*—Neil Abrams
*Attorney, Agent, or Firm*—Anton P. Ness

[57] ABSTRACT

An enclosure (10) for terminal blocks for connection of telephone service cables to others thereof or to a distribution cable (16) providing for mounting therewithin of different types of terminal block. A lid (12) is pivotable from a closed position to a first fully open position where it retains itself open, and may be further pivotable beyond the first open position to a second fully open position where it similarly retains itself open. At least two tab sections (80) of the lid's rear wall (40) have free ends (82) that abut the enclosure's rear wall when the lid is pivoted open. Corners (84, 85) of the tab free ends (82) compressively bear against the enclosure's rear wall and serve as detents to inhibit unintentional lid rotation out of either fully open position.

2 Claims, 12 Drawing Sheets

ENCLOSURE HAVING A LID PIVOTABLE TO A SELFSUSTAINING OPEN POSITION

This application is a Divisional of application Ser. No. 08/035,129 filed Mar. 18, 1993, now U.S. Pat. No. 5,378,174.

FIELD OF THE INVENTION

The present invention is directed to the field of enclosures for electrical connectors and more particularly to enclosures for terminal blocks for interconnecting service and distribution cables of telephone wires.

BACKGROUND OF THE INVENTION

In the telecommunications industry telephone distribution cable is introduced to individual telephone sites such as residences, mainly through use of a splice of pairs of tip and ring signal wires of the cable to tip and ring wires of a respective service cable at a junction located outside the house. The junction is housed within a protective enclosure which is mounted usually to an outside wall of the house. One example of such an enclosure is disclosed in U.S. Pat. No. 5,145,388 in which one or two-terminal modules are mounted each receiving either the tip or ring conductors of both the distribution cable and a selected service cable; the enclosure is adapted for either pole or wall mounting and includes a box section and a lid pivotable to a stable open position permitting access to the terminal modules and closable to a closed position and lockable thereat, with the opposing side walls being integral with the lid and the front and back walls being integral with the box section all adapted to seal the enclosure upon lid closing.

A variety of enclosures are known, mountable to poles or walls, within which are mounted one or more terminal blocks used to interconnect tip and ring wires of distribution cable and a plurality of service cables, including a rugged enclosure such as disclosed in U.S. Pat. No. 5,323,454. Other such enclosures are disclosed in U.S. patent application Ser. No. 08/032,890 filed Mar. 18, 1993 and assigned to the assignee hereof; the enclosures similarly contain terminal blocks mountable therein each interconnecting conductors of a distribution cable and an array of service wires, or two arrays of service wires, and which are easily openable to stable positions permitting access thereinto.

One type of terminal block for interconnecting a pair of wires is disclosed in U.S. Pat. No. 5,006,077. A tubular dielectric housing has a center post therein defining an annular cavity. A stationary tubular terminal is affixed within the cavity adjacent the center post; a rotatable tubular terminal is disposed within the cavity concentrically around the stationary terminal and in electrical engagement therewith at all times; and a tubular actuator is also mounted to the housing and is adapted to be rotated between actuated and unactuated positions to rotate the rotatable terminal. A pair of wire-receiving passageways of the assembly are defined at a termination site along apertures through the housing wall, through apertures of both terminals and the actuator, and at least into a center post aperture, all aligned in an unactuated state for a wire end to be inserted into one or both of the passageways. Upon rotation of the rotatable terminal by the actuator, slot walls of the terminal pierce the wire insulation of the one or two wires and engage the wire's conductor. The stationary terminal includes a contact section extending outwardly from the housing including insulation displacement slots for a wire to be inserted thereinto and terminated, the wire being one of a plurality of a multiconductor stub cable length which is secured to the enclosure containing a plurality of the terminal blocks, thus defining a cable harness. The two terminal members thus interconnect an appropriate conductor of the stub cable to a wire inserted into a termination site of the terminal block. In U.S. Pat. No. 5,219,302 is disclosed a modular terminal block containing two such rotatable terminal arrangements in cylindrical housing sections or silos as disclosed in U.S. Pat. No. 5,006,077.

U.S. Pat. No. 5,296,646 discloses a protector module for a telephone line junction box, wherein each module includes an array of protectors contained in respective cavities of a housing, and a ground plate to which ground electrodes of the protectors are commoned; the ground plate includes a ground strap along the bottom of the module to extend to a ground post of the enclosure within which the module is mounted, which in turn is connected to system ground. A pair of the protectors is connected in-line along the tip and ring circuits respectively of a telephone service line by means of a contact member, with the circuits being electrically connected to respective circuits of a distribution cable elsewhere in the enclosure.

Another protector module is disclosed in U.S. Pat. No. 5,321,577. The disclosure provides a two-terminal single module for crossconnecting or splicing the tip and ring lines of a service line, where the module also contains protector elements connected in-line with the respective terminals. The module also includes a ground strap to which the protectors are connected, the ground strap including a contact section exposed along the module bottom to engage an enclosure ground upon mounting of the module in an enclosure similar to the enclosure disclosed in U.S. Pat. No. 5,145,388.

It is desired to provide an enclosure which permits mounting therein of any one of a variety of telephone line interconnection devices or crossconnection devices.

It is also desired that such an enclosure is rugged and durable and provides for environmental sealing about cables extending through the cable exits.

It is further desired that such an enclosure be at least both wall-mountable and pole-mountable.

SUMMARY OF THE INVENTION

The present invention is an enclosure having a lid pivotally secured to a box in which are mountable interconnection or crossconnection modules or blocks, with the lid being openable to stable first and second open positions permitting access to the box, and closed and locked. A grommeted cable exit is provided for entry into the enclosure of a distribution cable; a second grommeted cable exit may also be provided permitting the cable to continue beyond the enclosure. An array of recesses define individual service cable exits and are provided along the forward edge of the front wall of the box, with edge grommet members secured along the forward edge providing sealing about the respective cables and closing off unused exits, as disclosed in U.S. patent application Ser. No. 08/032,889 Mar. 18, 1993 and assigned to the assignee hereof.

Along the bottom wall of the box (when the enclosure is considered prior to being vertically mounted), several ribs extend upwardly parallel to the front wall to provide support for the module or modules to be mounted in the enclosure. Each rib is castellated to define locating projections extending to be coplanar with the top rib edges, receivable into corresponding cavities in bottom surfaces of the two-terminal type of modules for accurate locating of the modules prior to fastening thereof in the enclosure; the locating projections also prevent rotation of the two-terminal style of module having a single mounting fastener should that style be the type utilized by the customer. Embossments extend upwardly from the bottom wall between the ribs and are apertured to enable threaded receipt of fasteners used in mounting modules in the enclosure or used in mounting a ground plate, and the embossments are also of appropriate height for their leading ends to be preferably coplanar with the top edges of the ribs. The locating projections of each rib are staggered with respect to those of the other ribs to be to either side of an associated embossment, permitting angled orientation of the two-terminal style of module permitting the wire-receiving apertures of both housing sections thereof directly to face a cable-receiving recess of the front wall of the enclosure.

The coplanar top edges of the ribs and embossments enable mounting thereon of a large terminal block and stably support the block above the bottom wall providing a clearance therebelow for conductor wires of the distribution cable. The coplanar top edges similarly stably support a common ground plate if desired, connected by a ground strap to a ground post of the enclosure, for establishing a ground circuit for protector module styles of modules mountable in the enclosure, with the ground plate engageable by ground straps exposed along the bottom of the protector modules. The enclosure includes a relief region or pocket defined along the bottom parallel to the ribs for receipt therealong of a distribution cable; the bottom wall can be planar and angled downwardly from back to front to form the cable pocket adjacent the front wall and between the cable exits of the side walls, with the ribs parallel to the front wall and of appropriately varying heights.

It is an objective of the present invention to provide an enclosure adapted to permit mounting therein of any one of a variety of terminal blocks and modules useful in interconnecting service cables to a distribution cable of a telephone line.

It is also an objective for the enclosure to easily adapted to permit mounting therein of protected modules and terminal blocks and provide for inherent grounding thereof upon mounting.

It is a further objective to provide the lid with integral detents cooperable with the rear wall of the box to positively retain the lid in an opened position.

An embodiment of the inventions will now be described by way of example with reference to the accompanying drawings.

DETAILED DESCRIPTION OF THE PREFERRED EMBODIMENTS

Figure 1:
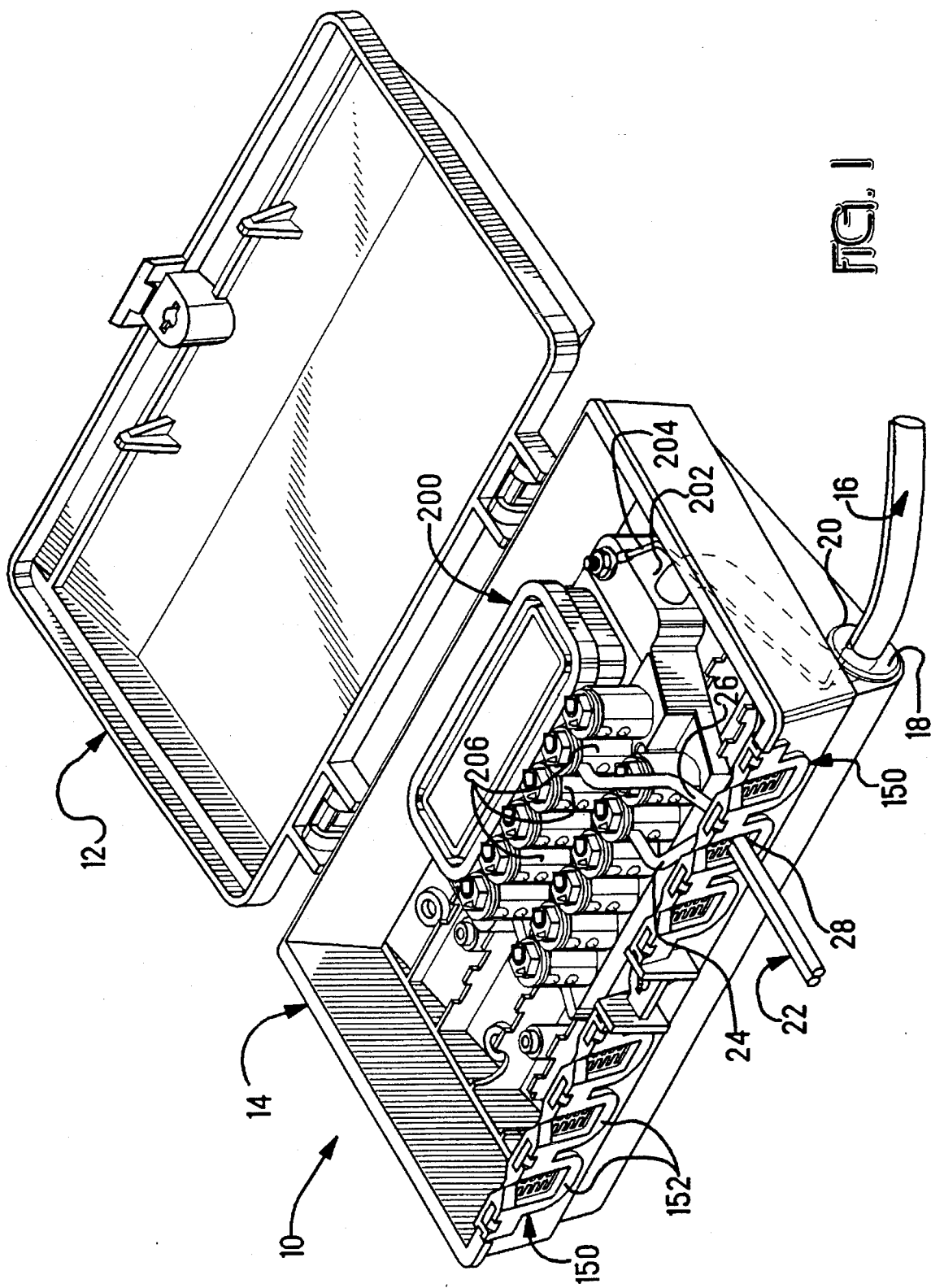
FIG. 1 is an isometric view of an enclosure of the present invention, with its lid in an open position exposing a protected module mounted therewithin having conductors of a representative service cable connected to conductors of a distribution cable within respective housing sections of the module.

In FIG. 1 enclosure 10 is shown with lid 12 in an open position exposing the interior of box section 14 having a protected module 200 mounted therein. Distribution cable 16 is shown extending into enclosure 10 at cable entry 18 through grommet 20. A representative service cable 22 having tip and ring conductor wires 24, 26 is shown extending into enclosure 10 at a cable entry 28; wires 24, 26 are interconnected with respective conductors (not shown) of distribution cable 16. Cable entry 28 is sealed about service cable 22 by portions of edge grommet 150 at a cable entry section 152 thereof.

Protected module 200 is of the type disclosed in U.S. Pat. No. 5,296,646. Distribution cable 16 is shown entering the protector housing portion 202 where its array of conductors are electrically connected in-line with protector devices (not shown) which protect the circuits against voltage surges. A ground circuit 204 is shown extending from protector housing portion and is electrically connected to a ground post in a forward portion of enclosure 10 (see FIG. 6) for connection to an external ground (not shown) as is conventional. Conductors (not shown) extend from the protector devices to respective terminals within individual housing sections 206 into which have been inserted respective ones of the tip and ring wires of the service cables for electrical connection thereto, as is disclosed in U.S. Pat. No. 5,296,646.

Lid 12 is fastened to box section 14 in a manner similar to that of U.S. Pat. Nos. 5,145,388 and 5,146,650, which permits pivoting between closed and open positions. The fastening arrangement enables the lid to remain in an open position without assistance (see FIG. 5) overcoming gravity and wind depending on the physical location and on the particular orientation in which the enclosure is mounted upon installation, thus facilitating electrical connection of the array of service cables and also repair and servicing thereof and of protector devices and terminals in module 200 after installation in the field. The durable fastening arrangement also utilizes no separate fastening elements and is easily moldable integrally with the box section 14 an the lid 12.

Figure 2:
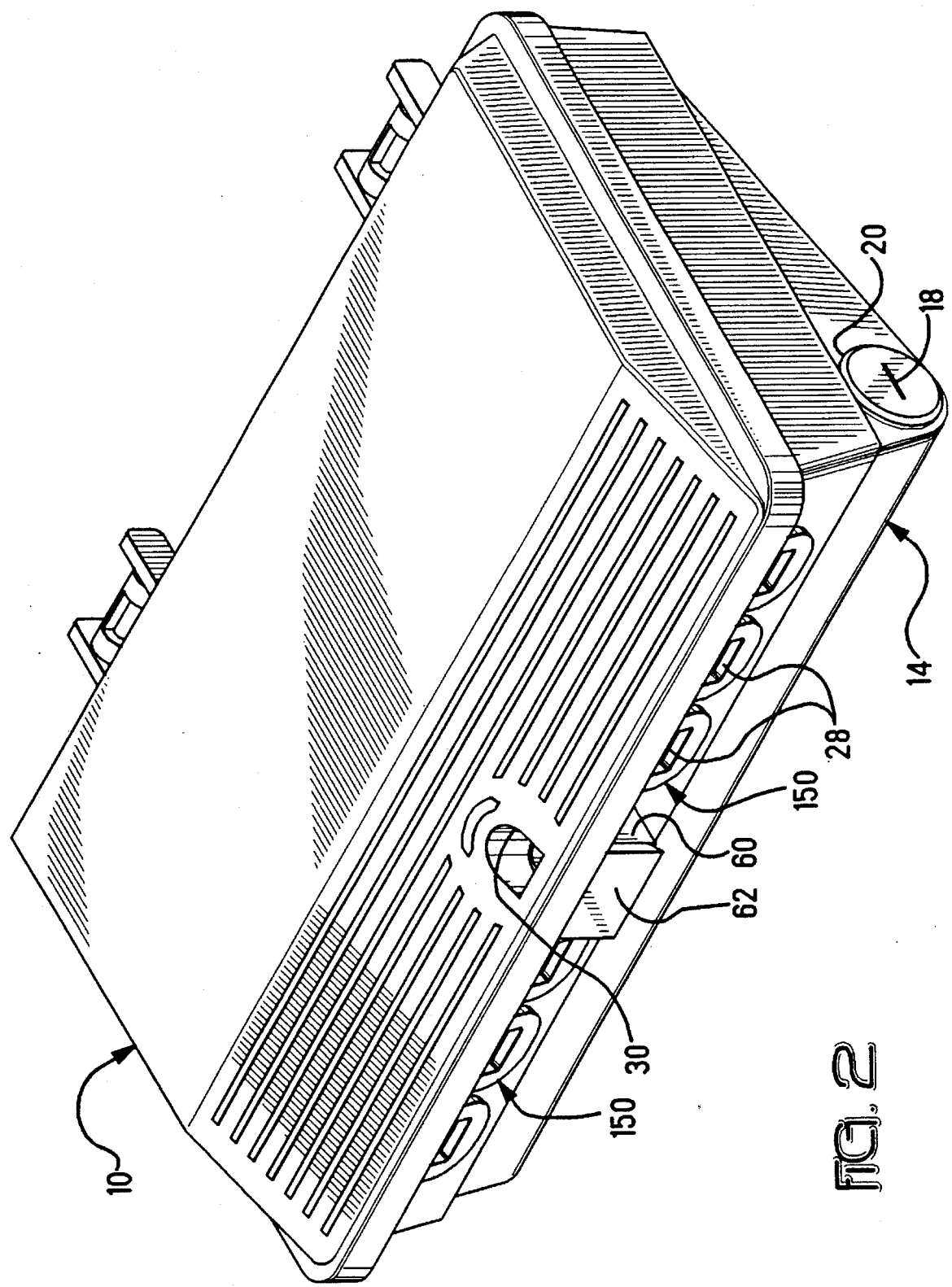
FIG. 2 is an isometric view of the enclosure with the lid in a closed position.

FIG. 2 illustrates an enclosure 10 with lid 12 in a closed position, having been pivoted forwardly and latched whereafter a security fastener (not shown) secured in fastener recess 30 is actuatable by special tools by authorized personnel of the telephone company, to lock the lid in its closed position, all as is conventional. Latching and locking sections 60 of box 14 and 62 of lid 12 are seen in greater detail in FIG. 3. Grommet 20 is seen at cable entry 18 having a virtual slit therein which will seal about a distribution cable upon installation in the enclosure, if required in the particular use to which the enclosure is put, and which otherwise remains sealed if no such distribution cable is to be used.

Figure 3:
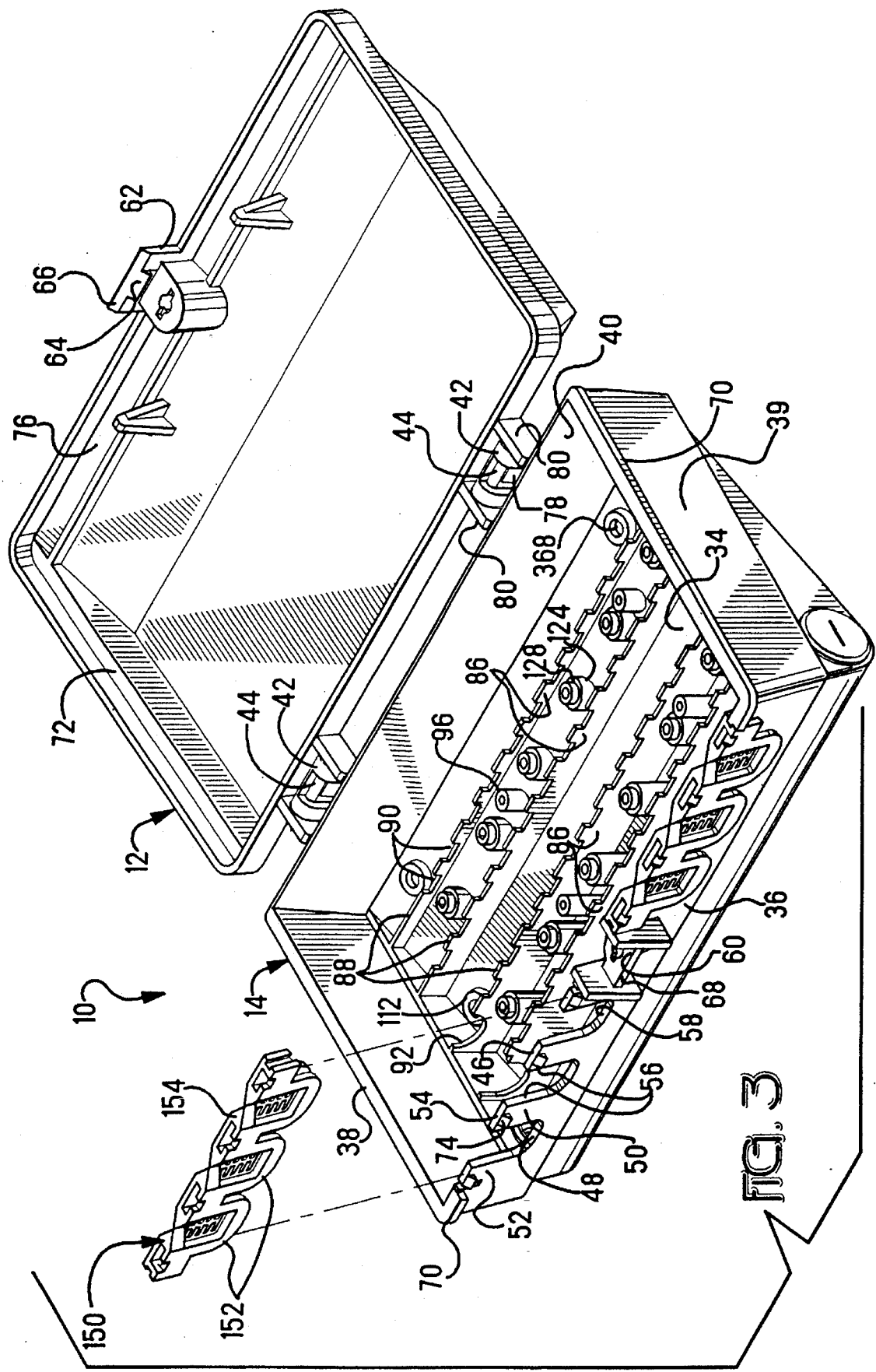
FIG. 3 is an isometric view of the enclosure of FIG. 1 with no module or block mounted therein, showing one of the edge grommets of the present invention exploded from the front wall thereof.
Figure 4:
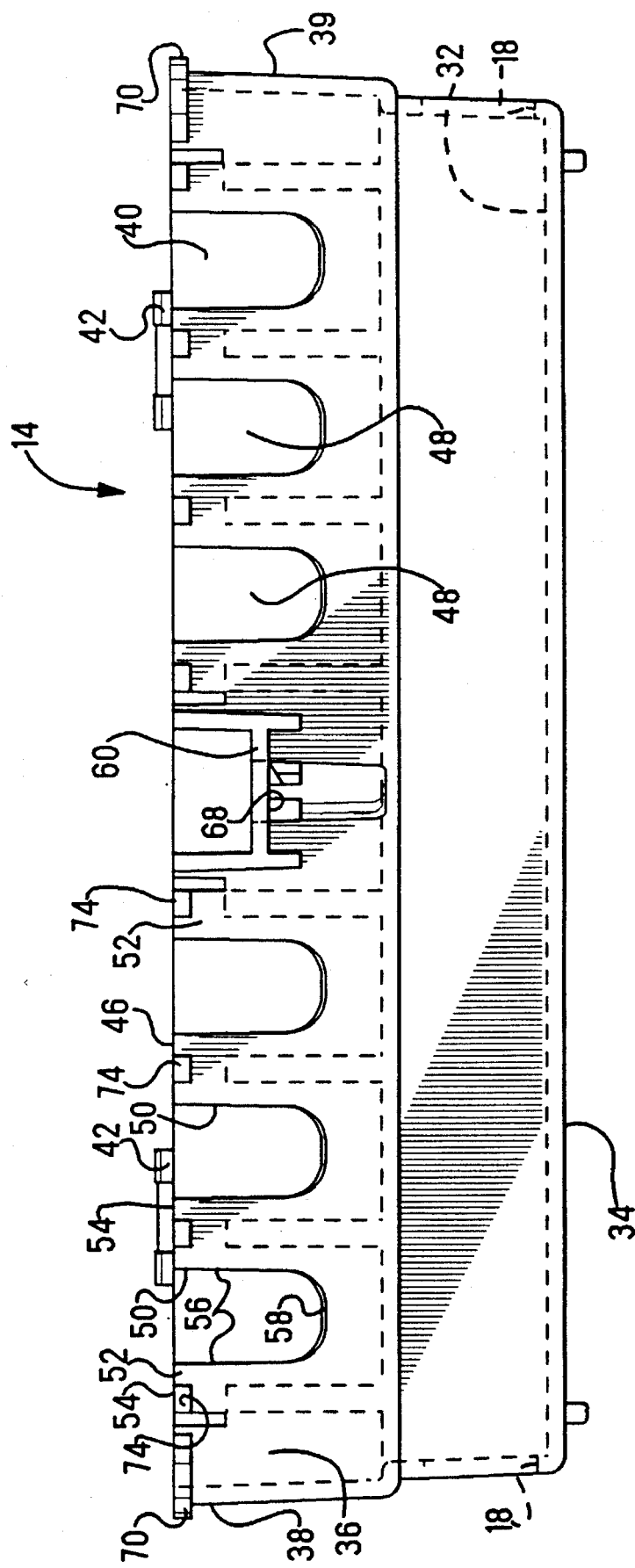
FIG. 4 is an elevation view of the enclosure with the edge grommets removed from the front wall thereof and showing cable-receiving recesses therethrough.
Figure 7:
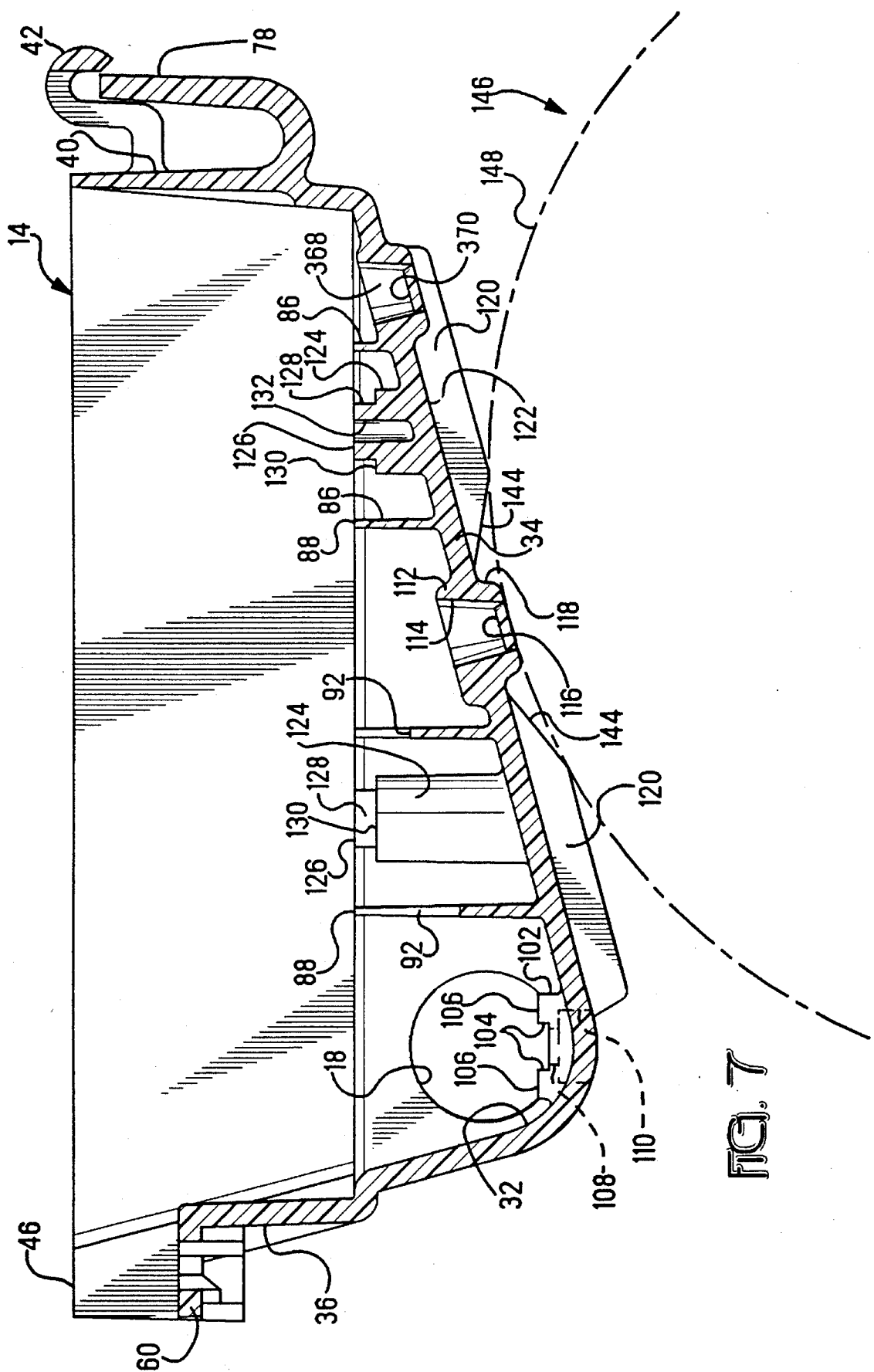
FIG. 7 is a cross-sectional view of the box portion of the enclosure, taken along line 7—7 of FIG. 6 and illustrating the enclosure mounted to the curved surface of a telephone pole.

In FIGS. 3 and 4, enclosure 10 is shown in greater particularity, again with lid 12 in its open position exposing the interior, with no modules or blocks mounted therein nor cables shown. An edge grommet 150 is seen exploded from box section 14. Box section 14 includes a bottom wall 34, front wall 36 side walls 38, 39 and rear wall 40. A distribution cable region 32 is defined adjacent front wall 36 extending between opposed cable entries 18 through side walls 38, 39 and is best seen in FIG. 7. Rear wall 40 includes integral hook-shaped projections 42 within which are pivotally movably held dowels 44 of lid 12.

Front wall 36 includes a forward edge 46 having recesses 48 extending into front wall 36 from forward edge 46 for eventual receipt therethrough of service cables. Upstanding wall sections 50 along with upstanding wall sections 52 to each side of the arrays of recesses 48, separate and define recesses 48, all extending to leading ends 54, and having opposed edge surfaces 56 defining parallel sides of recesses 48 which conclude in arcuate recess bottom edges 58. Arrays of recesses 48 are disposed to either side of latching and locking section 60 centrally located along front wall 36 cooperable with the complementary latching and locking arrangement 62 of lid 12. Latching may be by means of an inwardly directed latching projection 64 along the inner surface of tab 66 which latches beneath ledge 68 extending forwardly from front wall 36, upon lid closing. Outwardly directed lips 70 extend from top edges of side walls 38, 39 and becomes seated within corresponding recesses 72 of lid 12 upon closing thereof.

Referring to FIGS. 3 and 4, edge grommets 150 are associated with each array of recesses 48, with cable-receiving sections 152 associated with respective recesses 48. Edge grommets 150 are mountable to forward edge 46 such as by means of latching projections 74 adjacent leading ends 54 of upstanding wall sections 50, 52 of front wall 36 cooperable with latching recesses formed in edge grommets 150. The coplanar, virtually continuous upper surface 154 of edge grommet 150 engages and is compressible against an opposing ledge surface 76 of lid 12 upon closing, effectively forming an environmental seal. Edge grommets 150 are shown in greater particularity in FIGS. 11 to 15.

Figure 5:
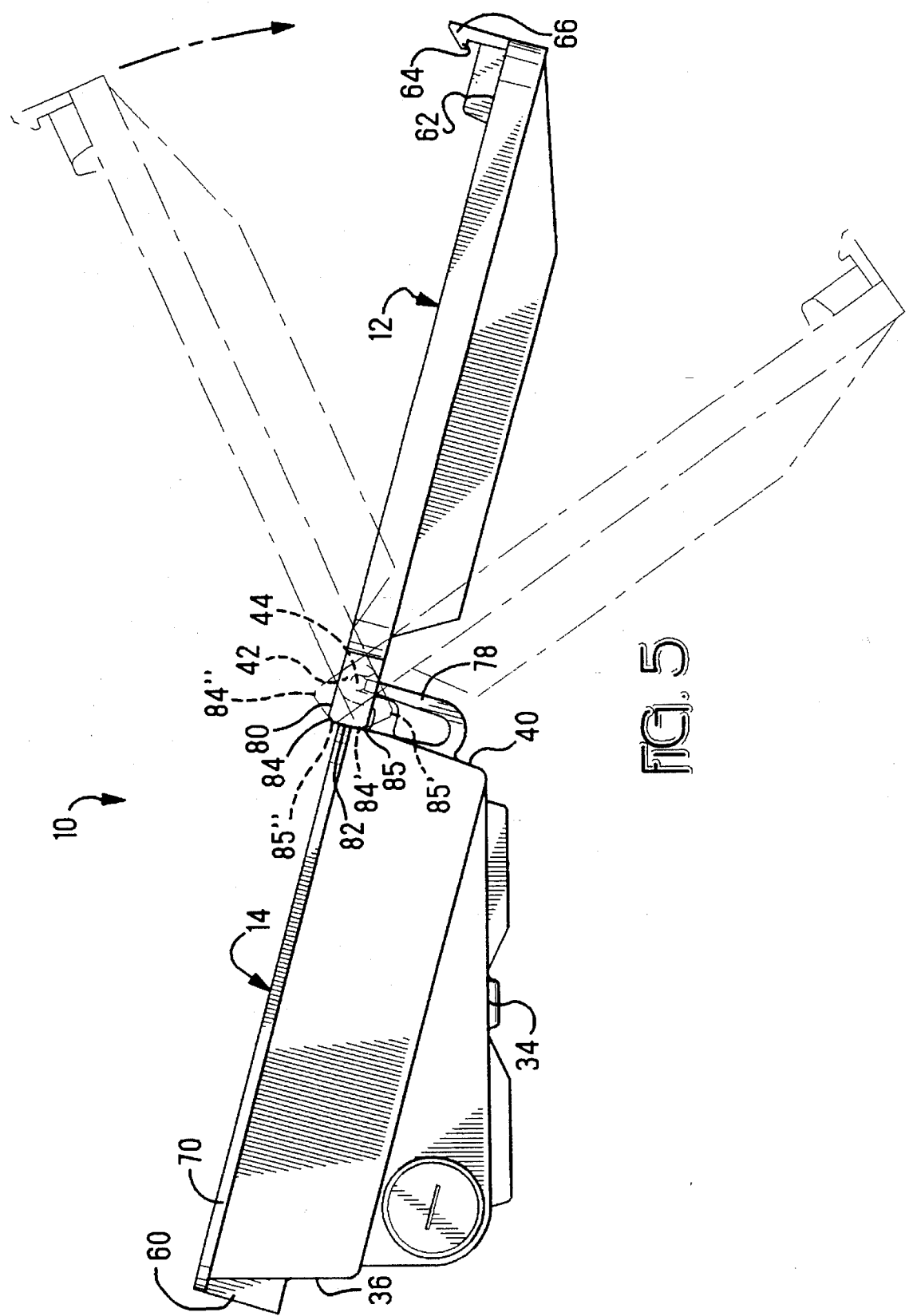
FIG. 5 is a side view of the enclosure with its lid partially opened (in phantom) and fully opened.

FIG. 5 is a diagrammatical representation of enclosure 10 with lid 12 in a first and fully opened position and both a partially open and a second fully open or over-center position, shown in phantom. Dowels 44 (in phantom) of the lid are held in and rotatable within hook-shaped projections 42 (in phantom) extending from the rear wall 40 of box section 14, secured therein by a latch arm 78. Each dowel 44 extends between a spaced pair of tab sections 80 which extend from the rear edge of lid 12 to preferably flat free ends 82 having first and second corners 84, 85 (designated 84',85' in the partially open position and 84",85" in the second fully open position). Free ends 82 are seen to extend parallel and closely adjacent to rear wall 40, when lid 12 is fully opened. The width of each tab section 80 is selected, and the spacing between free ends 82 and rear wall 40 is selected, such that corners 84, 85 of free ends 82 engage and bear compressively rear wall 40 during opening and closing of lid 12 with enough force that application of only a slight force on lid 12 will not overcome the engagement force and lid 12 will not continue to pivot, but that with application of greater force intentionally applied will enable corners 84, 85 to deflect a local portion of rear wall 40 to permit preferably rounded or at least chamfered corners 84, 85 to bear compressively against rear wall to permit further pivoting of lid 12. It can be seen that in the partially open position first corners 84' engage rear wall 40, and in pivoting beyond the first fully open position to the second fully open position, second corners 85" engage rear wall 40. Thus tab sections 80 serve as detents to define a stop for maintaining the position of lid 12 in a first fully open position when the resistance of the first corners 84' bearing against rear wall 40 has been overcome, or even in an over-center second fully open position exceeding 180° if desired (shown in phantom in FIG. 5), once the lid is further pivoted to overcome the resistance of the second corners 85" bearing against rear wall 40. Such a system permits telephone service personnel to devote full attention to duties within the enclosure with both hands free, such as insertion of wire ends into wire-receiving apertures of terminal containing housing sections of modules mounted within the enclosure and simultaneous actuation of the terminal actuators, or removal of wires or actuators during repair and servicing, or mounting additional or replacement modules therein, lid 12 remaining fully open despite gravity or air movement.

Figure 6:
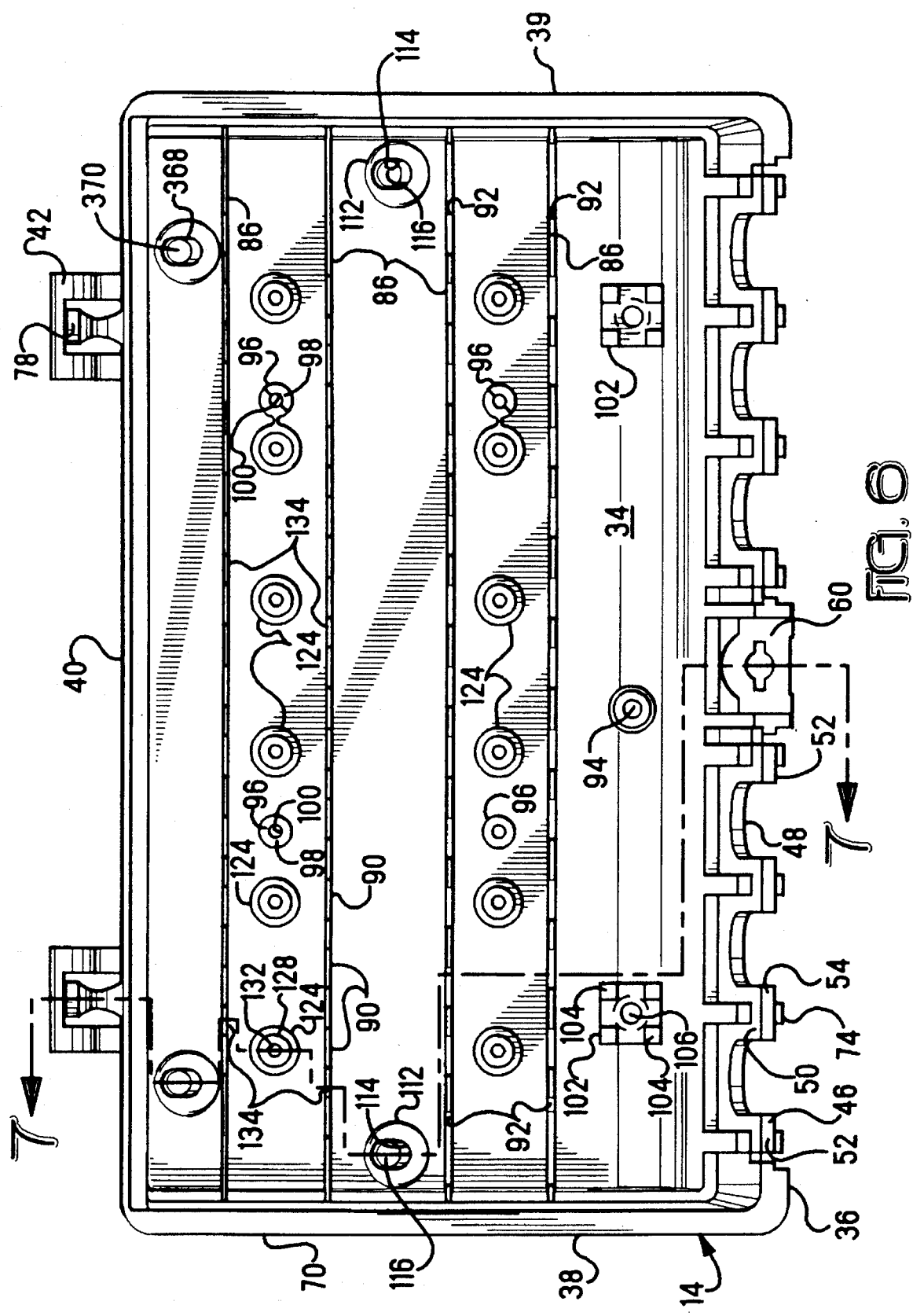
FIG. 6 is a plan view of the interior of the enclosure.

The full interior of box section 14 of enclosure 10 is shown in FIGS. 6 and 7. With reference to FIGS. 3, 6 and 7, four ribs 86 are shown coextending laterally across bottom wall 34 between side walls 38, 39 and extending upwardly therefrom to preferably coplanar top edge surfaces 88. Recesses 90 into top edge surfaces 88 are seen spaced therealong, and staggered from rib to rib, for seating of two-terminal modules and prevention of rotation thereof (see FIGS. 8 and 9) and give top edge surfaces 88 of ribs 86 a castellated appearance. Enlarged recesses 92 into the forwardmost ribs 86 adjacent side walls 38, 39 permit a length of a distribution cable 16 to be dressed toward rear wall 40 for entry into a multiterminal module such as protected module 200 of FIG. 1. Ground post 94 is positioned adjacent front wall 34, to which ground wires from the modules or ground plate are connectable, and which is connected to external ground by a ground cable (not shown) brought through a cable exit.

Four cylindrical projections 96 (referred to as "first projections") are shown rising from bottom wall 34 between each of the forward pair and rearward pair of ribs 86, to top surfaces 98 coplanar with top edge surfaces 88 of ribs 86. Each cylindrical projection 96 includes a blind aperture 100 extending thereinto enabling mounting of a module 200 (referred to as a "first type of module or block") as shown in FIG. 1 using four threaded fasteners (not shown).

A pair of square-shaped embossments 102 are seen adjacent front wall 36 near side walls 38, 39 including elevated sections 104 at each corner thereof having coplanar upper surfaces 106, and include an aperture 108 extending therethrough to an enlarged opening 110 through bottom wall 34. These square-shaped embossments 102 are useful for fastening wire management clips along bottom wall 34 of enclosure 10 for retaining a distribution cable 16 within and along region 32 of FIG. 7, such as Part No. 220-031212-05-0101 sold by Industrial Fasteners Corp., Port Washington, N.Y., wherein the recesses into the top surface of the embossments cooperate with features along the bottom surface of the clip for appropriate orientation and prevention of rotation during mounting.

A pair of rounded low-height embossments 112 are shown near side walls 38, 39 which include oval openings 114 extending thereinto to thin-walled frangible bottom surface portions 116 along the bottom extent 118 protruding slightly beneath bottom wall 34, with the frangible section easily punched out to permit receipt of the fastener therethrough. These rounded embossments 112 are useful for receipt thereto of fasteners for mounting enclosure 10 to a wall or a pole, in a manner assuredly supporting the fastener. The widened aperture facilitates molding of the aperture in a manner permitting molding of box section 14 in a simple two-draw mold using two opposing mold halves, enabling retraction of the upper mold half from the molded part, while defining a hole permitting and supporting a fastener shank perpendicular to bottom wall 34.

Seen in FIG. 7 are one of the pairs of ribs 120 aligned with each of low-height embossments 112 and extend beyond bottom surface 122 of bottom wall 34 a distance further than extents 118 of the low-height embossments. These ribs 120 include tapered surfaces 144 which engage the curved surface 146 of a pole 148 to stabilize the enclosure thereagainst beside the two spaced-apart mounting fasteners while permitting the extent 118 of embossment 112 to against the pole surface when mounted.

An array of cylindrical projections 124 (referred to as "second projections") are seen rising from bottom wall 34 between each of the forward pair and rearward pair of ribs 86, to top surfaces 126 coplanar with top edge surfaces 88 of ribs 86. Each cylindrical projection 124 includes a reduced diameter upper section 128 defining an upwardly facing ledge 130, and into each of which is formed a blind aperture 132.

Figure 8:
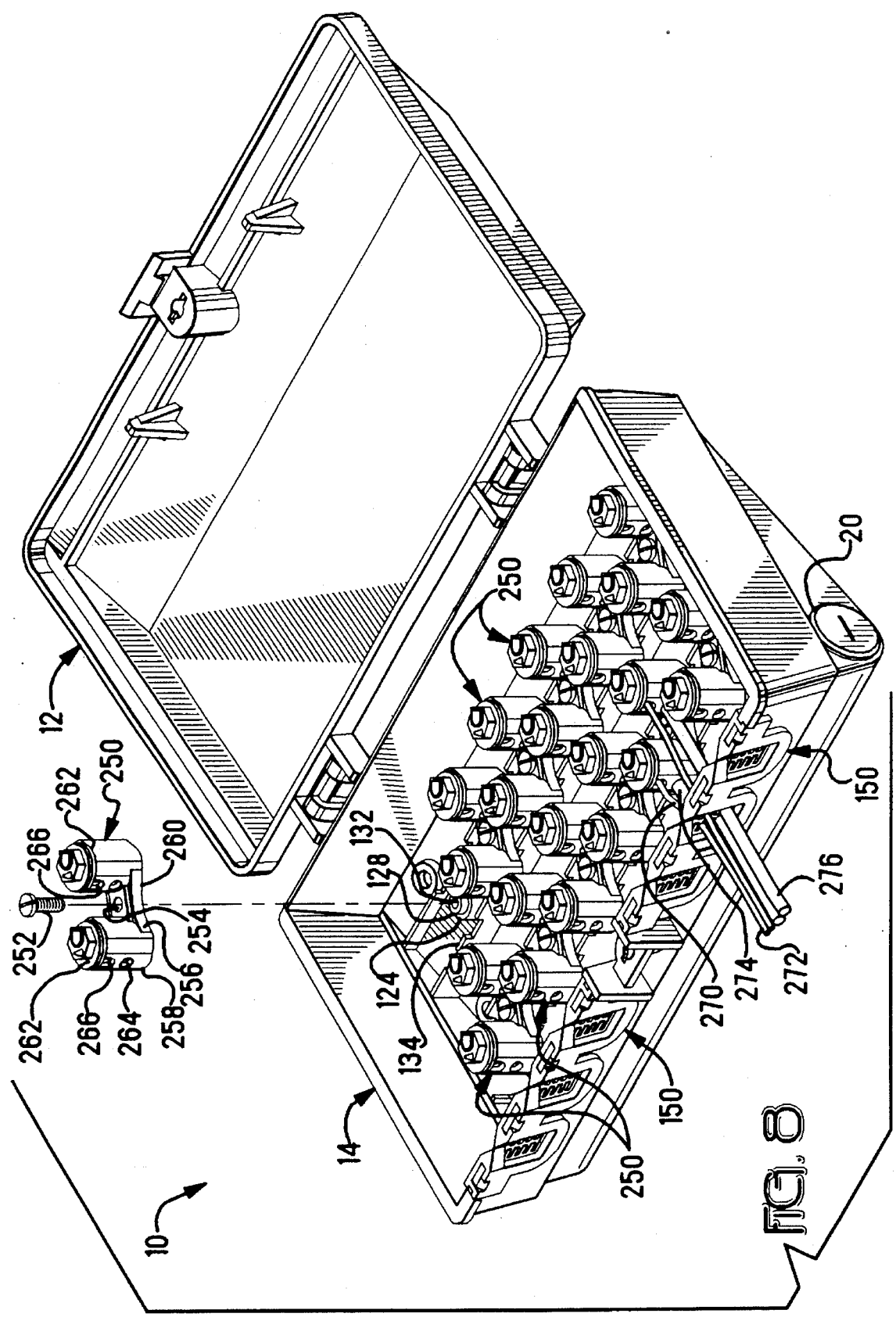
FIGS. 8 and 9 are isometric views of the enclosure of the present invention illustrating the mounting therewithin of an array of two-terminal crossconnect modules and two-terminal protected crossconnect modules respectively, with a representative pair of service lines being crossconnected.

Referring to FIGS. 7 and 8, such projections 124 are associated with respective two-terminal modules such as crossconnect modules 250 (referred to as "second type of modules or blocks") and are positioned to accommodate mounting thereof at appropriate spaced locations. Fasteners 252 are insertable through mounting holes 254 through base sections 256 of housing 258 and are self-threadable into blind apertures 132 as shown in FIG. 8. Each such module 250 is mounted so that base section 256 of housing 258 thereof straddles the gap between the adjacent ribs 86 within which the corresponding projection 124 is located.

Each projection 124 is associated with a pair of tab sections 134 of the adjacent ribs 86 which are defined between a pair of recesses 90 to have a selected width to be received into corresponding annular cavities (not shown) along the bottom housing surface 260 and beneath each terminal silo 262, as reduced diameter upper end 128 of projection 124 is also received into a corresponding cavity into bottom housing surface 260 substantially centered with respect to base section 256. The tab sections 134 for each module 250 are staggered to orient the module at a slight angle from an orthogonal orientation with respect to associated cable-receiving recesses 48 in front wall 36 of box section 14 of enclosure 10, so that wire-receiving apertures 264 of each silo 262 are both directly facing the same recess 48 for receipt thereinto of a corresponding wire end of respective tip and ring wires of service cables extending into enclosure 10 through recess 48. Modules 250 each include a second wire-receiving aperture 266 into each terminal silo 262 each of which receives the end of a second tip or ring wire 270 of a second service cable 272 to be crossconnected directly to a first tip or ring wire 274 of a first service cable 276.

Figure 9:
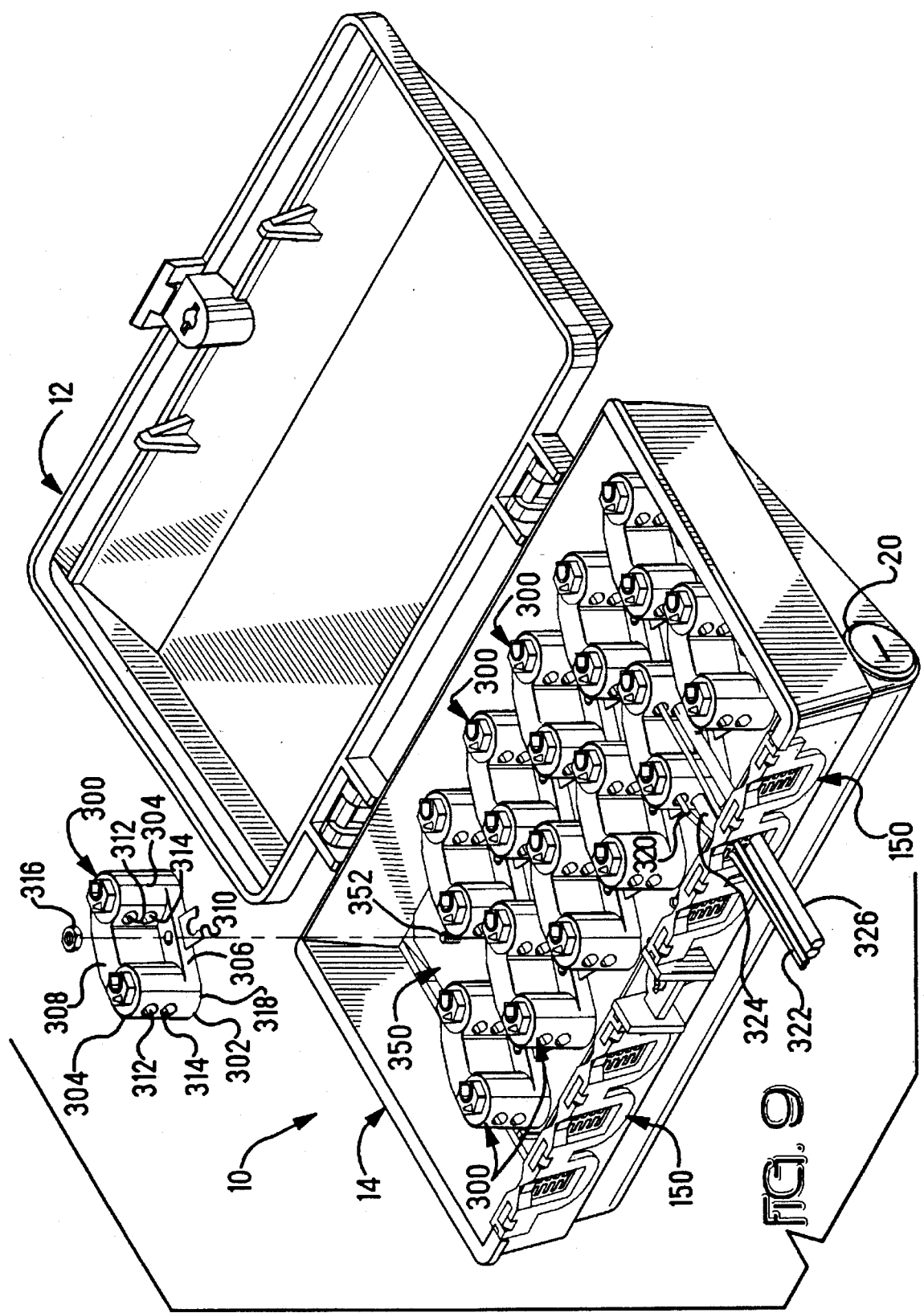

FIGS. 8 and 9 illustrate that enclosure 10 is adapted to be utilized in different ways according to need. In FIGS. 8 and 9 conductors of service cables are interconnected to each other by individual two-terminal modules 250, 300 with no distribution cable being utilized, in which case grommets 20 seal off cable exits 18 through each side wall 38, 39.

With reference to FIG. 9, each protected module, similarly to modules 250 of FIG. 8, includes a housing body 302 having a pair of cylindrical housing sections or terminal silos 304 extending upwardly from a base section 306 and in each of which is a respective terminal and actuator (not shown). Each protected module 300 includes two surge protector elements contained within protector housing section 308 and electrically connected to terminals within respective housing sections 304, all as disclosed in U.S. Pat. No. 5,321,577. The two protector elements are also grounded to a common ground strap having a contact section 310 extending laterally from base section 306. Modules 300 each include a first and second wire-receiving apertures 312, 314 into each terminal silo 304 each of which receives the end of a first or second tip or ring wire 320, 324 of first and second service cables 322, 326 to be crossconnected.

Figure 10:
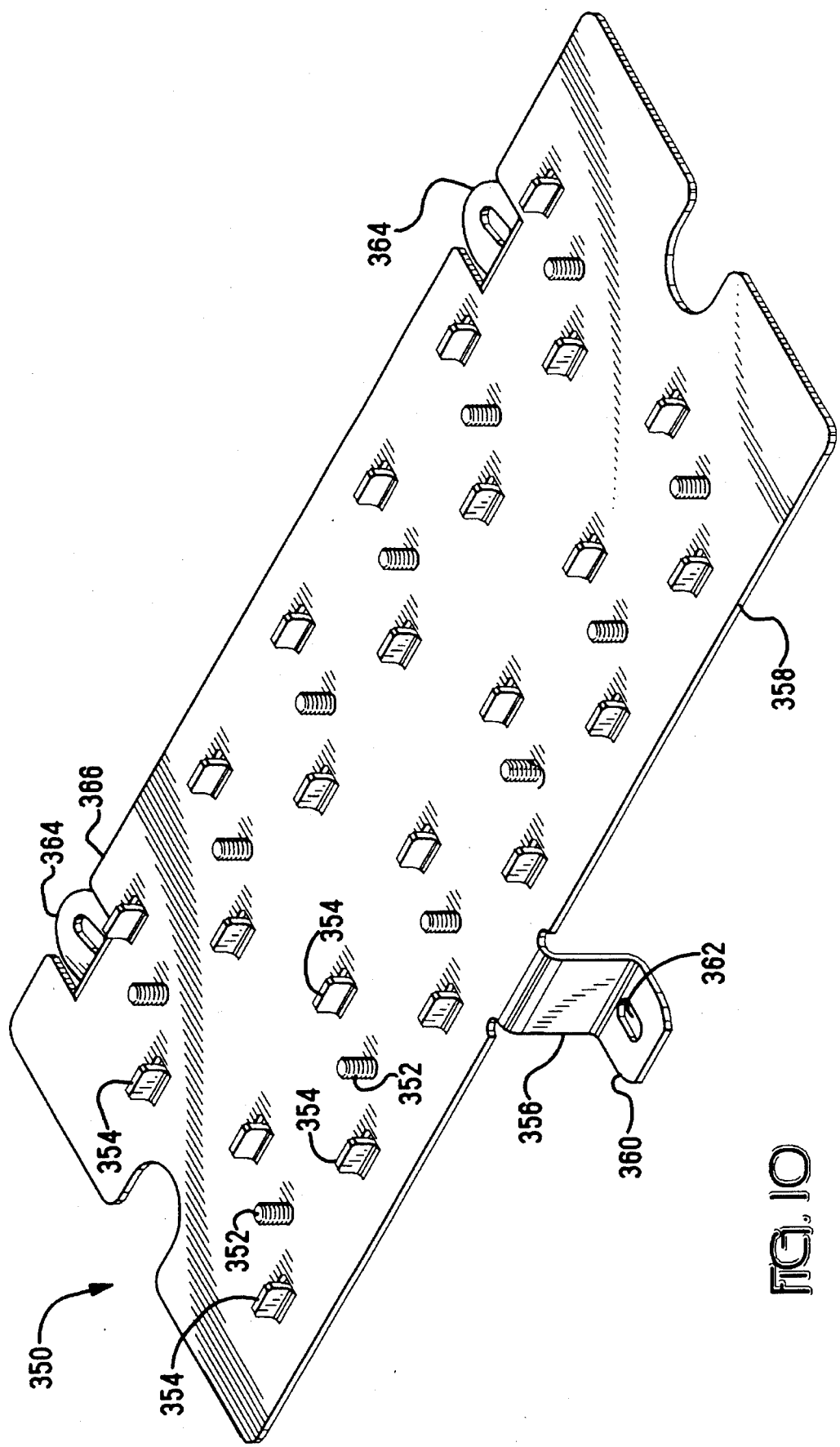
FIG. 10 is an isometric view of a ground plane mountable into the enclosure of FIG. 9 providing a grounding mechanism for the protected modules thereof.
Figure 11:
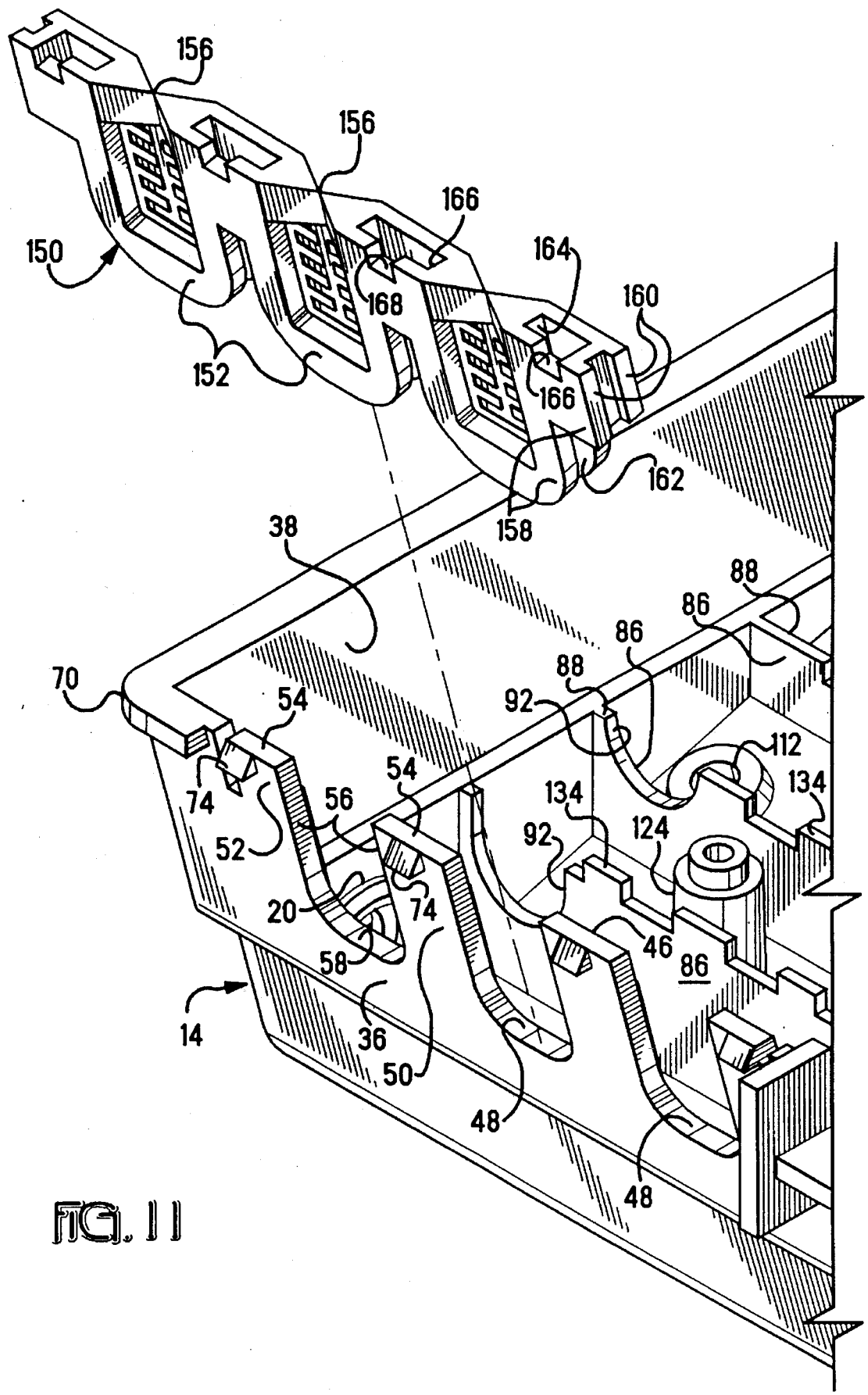
FIG. 11 to 15 are isometric, plan, elevation and bottom views and an enlarged cross-sectional view of a virtual cable-receiving slit of a section thereof respectively, of an edge grommet of the type useful with the enclosure of the present invention, with FIG. 11 illustrating assembly of the edge grommet with the enclosure.
Figure 12:
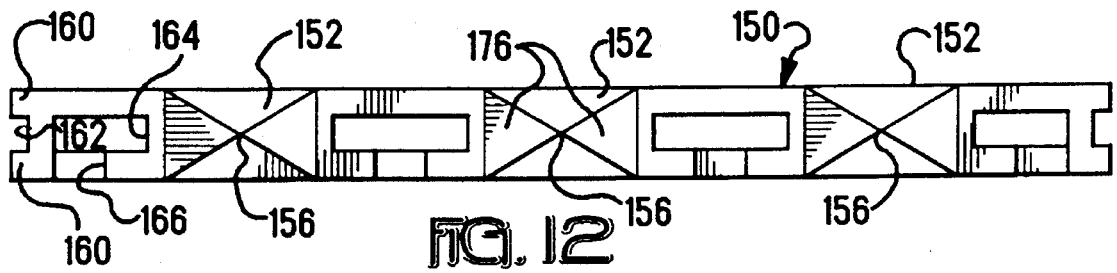

FIG. 9 illustrates that a ground plate 350 is mountable along top edge surfaces 88 of ribs 86 (shown in FIG. 7) with ground plate 350 grounded to ground post 94 (FIG. 5). In FIG. 10, ground plate 350 is shown, having threaded bolt portions 352 extending upwardly to extend through the slot in bifurcated contact sections 310 of protected modules 300, whereafter nuts 316 are secured thereonto clamping contact section 310 against the top surface of ground plate 350, all assuring a mechanical connection of module 300 within enclosure 10 and simultaneously defining a ground connection of contact sections 310 to ground plate 350. Associated with each bolt portion 352 is a pair of upturned tabs 354 forwardly and rearwardly therefrom analogous to the pair of tab sections 134 of the adjacent ribs 86 seen in FIG. 8. Upturned tab sections 354 are received into corresponding cavities (not shown) into the bottom housing surface 318 of modules 300 beneath each terminal silo 304 for orienting modules 300 with respect to cable-receiving recesses 48 along front wall 36 (FIG. 6) and prevention of rotation during module mounting. The tab sections 354 for each module 300 are staggered to orient the module at a slight angle from an orthogonal orientation with respect to an associated cable-receiving recess along front wall 36 of box section 14 of enclosure 10, so that wire-receiving apertures 314 of each silo 312 are both directly facing the recess for receipt thereinto of ends of corresponding respective tip and ring wires of service cables to be cross-connected.

Ground plate 350 includes a ground strap 356 depending from its forward edge 358 then extending forwardly to an end 360 having an aperture 362 therethrough enabling fastening by a nut to ground post 134 near front wall 36 of enclosure 10 to complete the ground path and the protection circuit. Ground plate 350 further includes a pair of similar strap sections 364 extending outwardly from rearward edge 366 which enables complete mounting of ground plate 350 within enclosure 10 by fasteners (not shown) extending through apertures 368 through bottom wall 34 of box section 14. Preferably apertures 368 are initially closed by thin-walled sections 370 which are frangible and can be easily punched out when the fasteners are to be used to mount ground plate 350 in enclosure 10, but remain intact to retain the sealed nature of enclosure 10 when no ground plate is desired to be mounted therein, when other modules are to be mounted such as two-terminal modules 250 of FIG. 8 or terminal blocks or protected terminal blocks like module 200 of FIG. 1.

Box section 14 and lid 12 of enclosure 10 may be molded from thermoplastic such as polypropylene. The features of both the box section and the lid are shown to be so shaped as to permit molding in an economical two-draw mold apparatus having two mold halves separable along a single axis to release the molded part.

Referring now to FIGS. 11 to 15, an edge grommet 150 is shown of the type disclosed in U.S. patent application Ser. No. 08/032,889 filed Mar. 18, 1993 and assigned to the assignee hereof. Edge grommet 150 is molded of elastomeric material such as of SARLINK 1360 Elastomer/PVC Alloy, oil resistant thermoplastic elastomer sold by DSM Thermoplastic Elastomers, Inc., Leominster, Mass. Edge grommet 150 includes sections 152 associated with the cable-receiving recesses 48 of the enclosure which coextend from top edge 154 which will extend along the forward edge 46 of front wall 36 of box section 14 as sections 152 are disposed within respective ones of cable-receiving recesses 48. Each section 152 includes a virtual slit 156 openable as a cable is moved laterally into the section from top edge 154, and which is somewhat stiffly elastic to grip the cable and close off the recess about the cable. The edge grommet includes bottom edge portion 158 which upon assembly onto front wall 36 will be adjacent the edge surfaces thereof comprising top edge surfaces 54 of wall sections 50, 52 of front wall 36 and also side edges 56 and bottom edges 58 of each cable-receiving recess 48. Bottom edge portion 158 is thick and sturdy, and the thickness is reduced inwardly thereof at each respective cable-receiving section 152 extending from opposing sides to the slit 156. The thick contoured bottom edge portion 158 preferably includes outer and inner lips or flanges 160 defining a channel 162 into which the edge surfaces of the enclosure wall are received to provide a sealed interface.

Preferably the edge grommet is mechanically securable to the enclosure front wall. Front wall 36 includes a plurality of upstanding wall sections 50, 52 of limited width between the cable-receiving recesses 48 and also beside the outer recesses, which are receivable into close fitting apertures 164 through the thick contoured edge 158 of edge grommet 150. Latching projections 74 on upstanding wall sections 50, 52 adjacent forward edge 46 of front wall 36, latchingly engage corresponding latching recesses 166 of edge grommet 150 at trailing or upper ends of the close fitting apertures 164 after the edge grommet has been fully inserted onto front wall 36. This arrangement permits removal and replacement of an edge grommet if desired.

Figure 13:
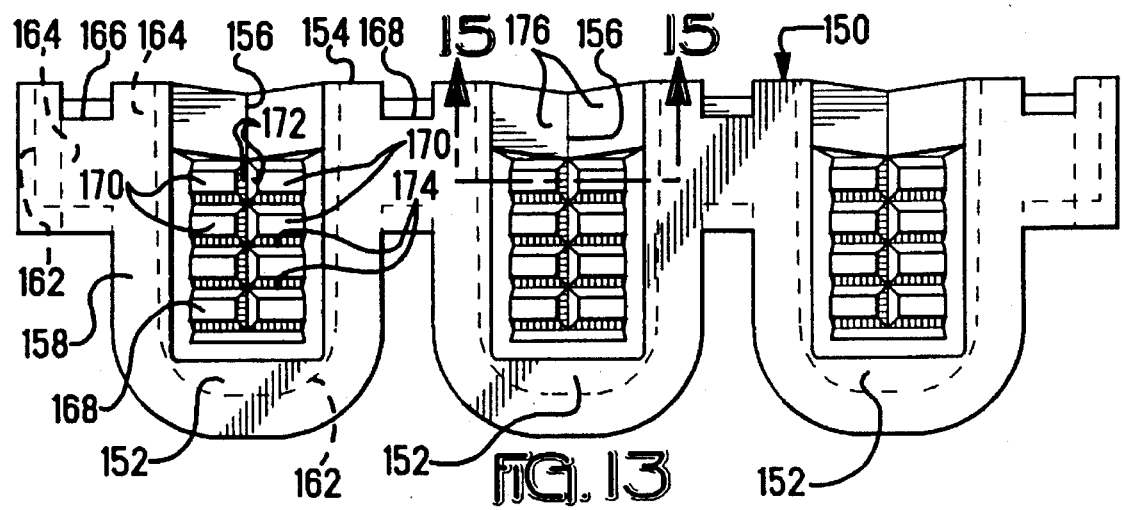
Figure 14:
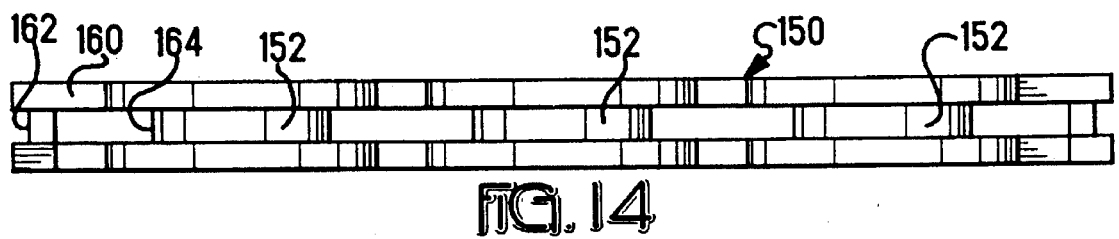
Figure 15:
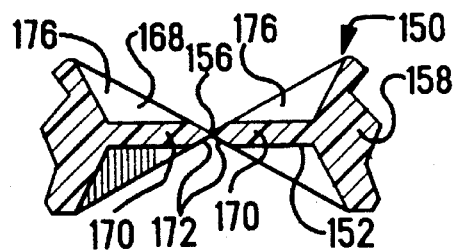

Referring especially to FIGS. 13 and 15, a thin diaphragm section 168 extends across most of the cable-receiving opening 48 which is traversed by a section 152 of edge grommet 150, vertically bisected by virtual slit 156. Diaphragm 168 is thick enough to retain sufficient stiffness to grip against the insulative outer jacket of a service cable extending therethrough slid into slit 156 from upper surface 154 of edge grommet 150. Preferably diaphragm 168 is defined by several pairs of small horizontal strips sections 170 having ends 172 along virtual slit 156 and which are initially joined to vertically adjacent others thereof at frangible sections 174, which upon insertion of a service cable into slit 156 become controllably torn, permitting forward or rearward deflection of ends 172 of strips 170. Ends 172 remain biased against the insulative outer jacket of a service cable by the resilience of the elastomeric material. Upper ones of strips 170 located above a service cable pushed downwardly therepast will resile and substantially close the opening above the service cable, with ends 172 of the horizontally adjacent strips 170 returning to their adjacent state at virtual slit 156. The upper entrance of each section 152 is defined by stiff opposed pointed structures 176 along upper surface 154 which meet at virtual slit 156, which structures permit a service cable to be urged therethrough from above but which close completely after the cable has been urged into the region of diaphragm 168.

The enclosure of the present invention defines an environmentally sealed region for electrical interconnection or cross-connection of wires of service cables with each other or with conductors of a distribution cable. The enclosure is easily moldable in an integral box section and integral lid and is especially adapted to permit and facilitate mounting therein of several different kinds of terminal blocks and modules. Mounting of the enclosure to a wall or to a pole is provided for, and the lid is designed to remain open for personnel to have unhindered access to the interior for cable termination and service and repair.

Variations and modifications may be made which are within the spirit of the invention and the scope of the claims. For example, additional reinforcing embossments may be used to enable fastening at four locations to a wall or pole, if desired. Projections may be placed at other locations along the bottom wall to enable mounting of terminal blocks of different types or sizes, if desired.

What is claimed is:

1. An enclosure, comprising:

a box section having a bottom wall, front wall, rear wall and opposing side walls and adapted to contain articles therewithin; and a lid pivotally movable from an open position to a closed position spanning the top of said box section and engaging top edges of said front and rear and opposing side walls of said box section, a rear edge surface of said lid in said closed position includes extending rearwardly therefrom at least one tab section having a substantially flat vertical free edge surface extending between first and second corners, said tab section having a length such that upon pivoting of said lid to a position intermediate said closed position and at least a first fully open position, said first corner of said free edge surface compressively engages an outer surface of said rear wall of said box section requiring increased force to be applied to further pivot said lid until said free edge surface abuts said rear wall defining said first fully open position, whereby when said enclosure is mounted to a vertical surface and said lid is pivoted upwardly to said first fully open position, said first corner will bear compressively against said outer surface of said rear wall of said box section to retain said lid in said first fully open position until sufficient force is applied to pivot said lid to its closed position.

2. An enclosure as set forth in claim 1 wherein said lid is adapted to be pivotable beyond said first fully open position to a second fully open position by application of increased force to overcome resistance to further pivoting created by said second corner bearing compressively against said outer surface of said rear wall of said box section.

\* \* \* \* \*